UNITED STATES PATENT OFFICE.

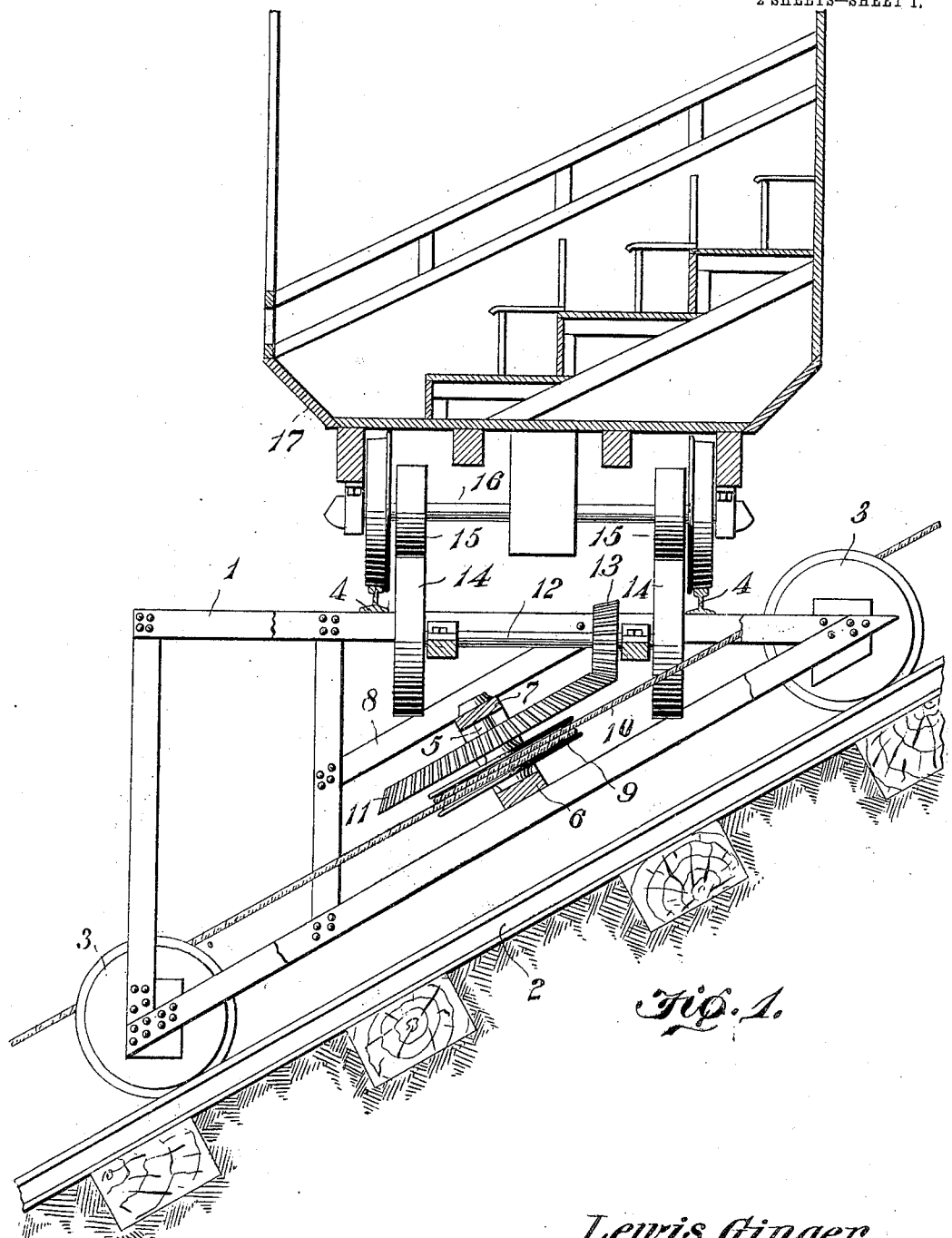

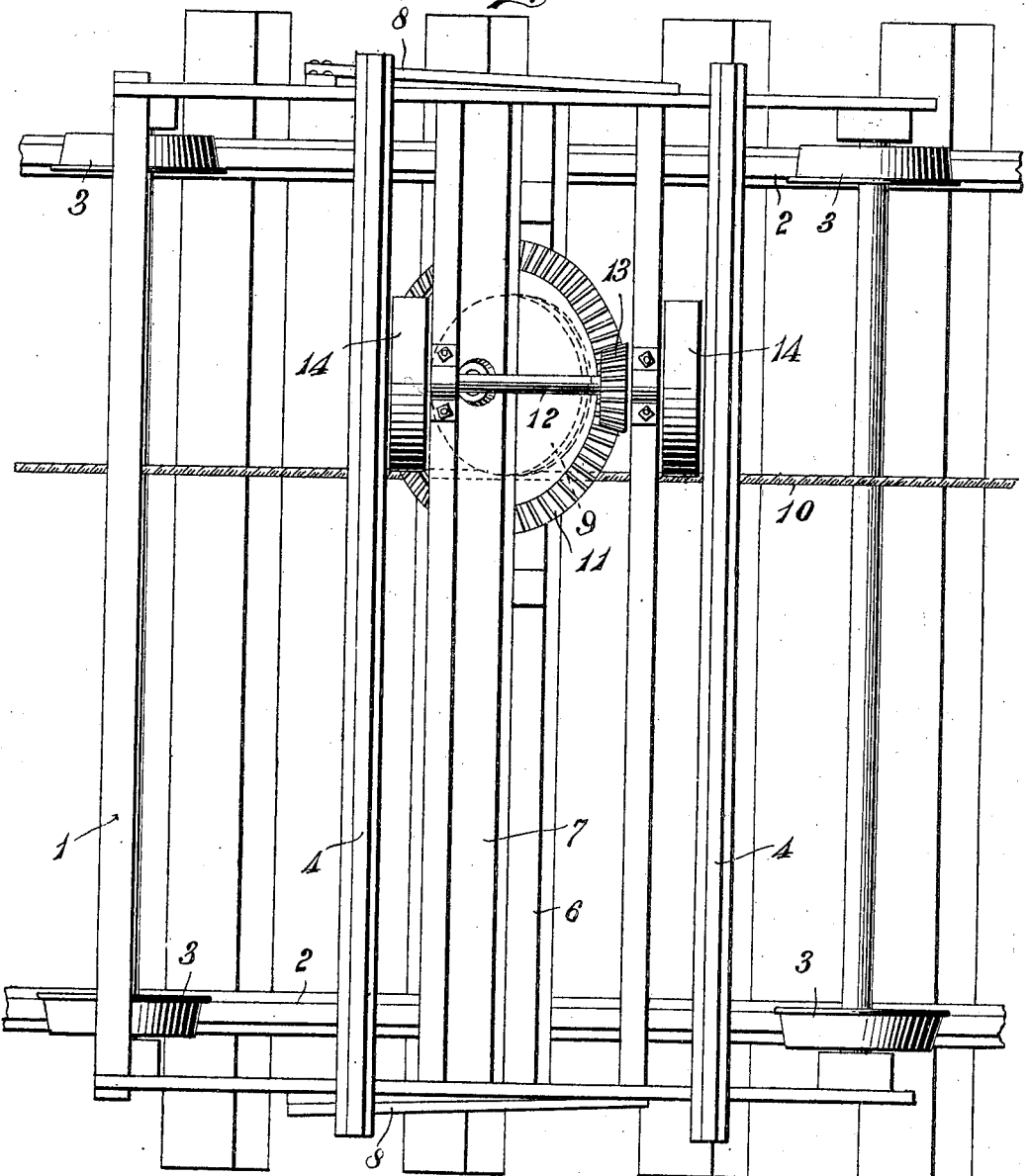

LEWIS GINGER, OF COLORADO SPRINGS, COLORADO.

RAILWAY.

No. 821,796.  Specification of Letters Patent.  Patented May 29, 1906.

Application filed March 10, 1906. Serial No. 305,384.

*To all whom it may concern:*

Be it known that I, LEWIS GINGER, a citizen of the United States, residing at Colorado Springs, in the county of El Paso and State of Colorado, have invented a new and useful Railway, of which the following is a specification.

This invention relates to railways, and has for its object to provide for the bodily elevation of cars along inclined track portions which are so abrupt as to preclude the possibility of the car traveling thereon on its own wheels. In this connection it is proposed to employ a truck traveling upon the inclined track portion and designed to support a car, the truck being provided with means driven from the car for moving the truck along the track in a prompt and positive manner.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

In the drawings, Figure 1 is an end elevation of an elevator embodying the features of the present invention, a fragmentary portion of a car being shown thereon. Fig. 2 is a plan view of the elevator with the car removed.

Like characters of reference designate corresponding parts in both figures of the drawings.

The truck 1 of the present apparatus has the cross-sectional shape of a right-angle triangle with its hypotenuse disposed in substantial parallelism with the abruptly-inclined track 2 upon the side of a mountain or other abrupt incline. This truck is provided with suitable flanged wheels 3, running upon the track 2, and upon the top of the truck are track-rails 4, disposed at right angles to the track 2 and having the standard gage. Within the frame of the truck there is a counter-shaft 5, disposed at substantially right angles to the inclined bottom of the truck and journaled in suitable frame-bars 6 and 7, the latter being connected at each end to a brace 8, disposed in parallelism with the bottom of the truck. Upon this counter-shaft is a grooved wheel or drum 9, around which is wrapped a cable 10, having its upper end suitably anchored at the upper end of the track 2 and its other end anchored at the bottom of the track. A beveled gear 11 is also carried by the counter-shaft 5 and is disposed above the drum. Located above the counter-shaft 5 is a substantially horizontal drive-shaft 12, disposed in a direction front and rear of the truck and carrying a beveled pinion 13, in mesh with the gear 11. There are also friction-wheels 14, carried by the shaft 12 and rising above the top of the truck between the rails 5 and designed to engage friction-wheels 15, mounted upon the driven axle 16 of a motor-car 17.

In practice a motor-car is run onto the rails 4 from a main-track section, and when the friction-wheels 15 of the driven axle of the car engage the friction-wheels 14 of the truck the shaft 12 will be rotated, and through the medium of the pinion 13 and the gear 11 the drum 9 will be rotated in one direction or the other to move the truck upwardly or downwardly along the track 2. It will of course be understood that provision is made for preventing the car from running off of the truck during the movement of the latter; but as such means forms no part of the present invention it has not been illustrated.

Upon examination of Fig. 2 it will be noted that the distance between the rails 2 is very much greater than that between the rails 4 in order that the truck may be long enough to accommodate the length of the car without danger of the truck being tilted when the car is running on and off of the truck.

Having thus described the invention, what is claimed is—

1. The combination of an inclined track, an elevator traveling thereon, a drum carried by the elevator, a cable wound upon the drum with one end anchored at the top of the track and the other end anchored at the bottom of the track, and means actuated by a motor-car upon the truck for rotating the drum to raise and lower the truck.

2. The combination of an inclined track, a truck running thereon, a drum mounted upon the truck, a cable wound upon the drum with its free end anchored at the top of the truck and its lower end anchored at the bottom of the track, a gear connected to the drum, a drive-shaft mounted upon the truck, a gear upon the drive-shaft and in mesh with the first-mentioned gear, and a drive-wheel mounted upon the shaft and projecting above the top of the truck.

3. The combination of an inclined track, a truck running thereon, a track upon the top of the truck at substantially right angles to the first-mentioned track, and truck-elevating means carried by the truck and including a drive-wheel rising above the top of the truck between the track-rails thereon.

4. The combination of an inclined track, a truck running thereon, a drum mounted upon an upright axis upon the truck, a cable wound upon the drum with one end anchored at the top of the track and the other end anchored at the bottom of the track, a substantially horizontal drive-shaft mounted upon the truck and operatively connected to the drum, and a drive-wheel carried by the drive-shaft and rising above the top of the truck.

In testimony that I claim the foregoing as my own I have hereto affixed my signature in the presence of two witnesses.

LEWIS GINGER.

Witnesses:
  W. S. MORRIS,
  M. I. ANDERSON.